(12) United States Patent
Eitel

(10) Patent No.: US 11,346,486 B2
(45) Date of Patent: May 31, 2022

(54) SEALING SLEEVE FOR INSERTING INTO A PIPING SYSTEM

(71) Applicant: Hans Bohnet, Schoemberg (DE)

(72) Inventor: Jens Eitel, Wildbad (DE)

(73) Assignee: Hans Bohnet, Schoemberg (DE)

( * ) Notice: Subject to any disclaimer, the term of this patent is extended or adjusted under 35 U.S.C. 154(b) by 0 days.

(21) Appl. No.: 16/995,275

(22) Filed: Aug. 17, 2020

(65) Prior Publication Data

US 2020/0378542 A1 Dec. 3, 2020

Related U.S. Application Data

(63) Continuation of application No. PCT/DE2019/100141, filed on Feb. 13, 2019.

(30) Foreign Application Priority Data

Feb. 15, 2018 (DE) ...................... 20 2018 100 823.4

(51) Int. Cl.
*F16L 55/163* (2006.01)

(52) U.S. Cl.
CPC .................................. *F16L 55/163* (2013.01)

(58) Field of Classification Search
CPC ... F16L 55/1652; F16L 55/163; F16L 55/162; F16L 55/165; F16L 55/18
USPC ............ 138/98, 97; 405/184.2; 285/15, 397, 285/370, 373
See application file for complete search history.

(56) References Cited

U.S. PATENT DOCUMENTS

| 5,465,758 A * | 11/1995 | Graf | F16L 55/163 138/97 |
| 5,769,459 A | 6/1998 | Graf et al. | |
| 9,145,998 B2 | 9/2015 | Bohnet et al. | |
| 9,574,695 B2 * | 2/2017 | Graf | F16L 55/163 |
| 9,951,578 B2 * | 4/2018 | Kitzman | E21B 33/134 |
| 2008/0193221 A1 * | 8/2008 | Lee | F16L 55/163 405/184.2 |

FOREIGN PATENT DOCUMENTS

| DE | 44 01 318 A1 | 3/1995 |
| DE | 20 2016 104 723 U1 | 11/2016 |
| EP | 0 805 932 B1 | 1/2010 |
| EP | 2 603 728 B1 | 11/2016 |
| WO | WO 2013/127498 A1 | 9/2013 |

* cited by examiner

*Primary Examiner* — Patrick F Brinson
(74) *Attorney, Agent, or Firm* — Muncy, Geissler, Olds & Lowe, P.C.

(57) ABSTRACT

A sealing sleeve for inserting into a piping system in order to seal a leak, having a steel sheet, which is annularly bent together and having at least one locking device in the form of a slot which is arranged in the steel strip in the circumferential direction and which has at least one row of teeth. The locking device also having at least one detent member, which is suitable for engaging in at least one row of teeth. The detent member has at least one guide element, at least one detent element and at least one tensioning element, which is arranged between one guide element and one detent element and is designed in such a way that the tensioning force between the guide element and the detent element can be varied and thus the detent effect of the detent member can be controlled.

18 Claims, 4 Drawing Sheets

SEALING SLEEVE FOR INSERTING INTO A PIPING SYSTEM

This nonprovisional application is a continuation of International Application No. PCT/DE2019/100141, which was filed on Feb. 13, 2019, and which claims priority to German Patent Application No. 20 2018 100 823.4, which was filed in Germany on Feb. 15, 2018, and which are both herein incorporated by reference.

BACKGROUND OF THE INVENTION

Field of the Invention

The present invention relates to a sealing sleeve for inserting into a piping system in order to seal a leak in a piping system, as are known, for example, for sewers.

Description of the Background Art

There are various techniques for sealing piping systems. A distinction is made between the sealing of piping systems from the interior, in particular from those piping systems which can be walked on, compared to the sealing of piping systems from the exterior. The differences are diverse and of a fundamental nature, so that, for example, a system for sealing from the interior cannot be used for sealing from the exterior and vice versa.

A sleeve for pressing a sealing sleeve onto a first and a second pipe in the region of the joint from the exterior is known from the international patent application WO 2013/127498 A1. The sealing sleeve is placed over the region to be sealed, in particular over a region with a gap between abutting pipes, and pressed from the exterior onto the pipe with a multi-part metallic sleeve, which encloses the sealing sleeve, which is thereby sealed. The structure of this system for sealing a pipe from the exterior proves to be very complex and difficult to manipulate. In addition, it is particularly prone to errors in manipulation.

A system for sealing a piping system from the interior with a fluid-tight hose for introduction into the region of the gap between two pipes of a piping system to be sealed is known from the European patent application EP 2 603 728 A1, which corresponds to U.S. Pat. No. 9,145,998. The hose is provided with a feed element containing a valve for introducing the fluid into the hose and the system is provided with a pump for conveying the fluid, which can be connected to the feed element. In particular, the system also contains a metallic protective ring, which is arranged inside the region of the pipe gap provided with the hose according to the invention in such a way that the protective ring covers the gap with the hose on the inside of the two pipe ends and thereby prevents the hose from being obstructed or damaged by objects sliding past it, which may have sharp-edged corners. This creates a very secure system which is easy to manipulate for sealing a piping system.

Sealing pipe leaks from the interior of the pipe is known from German patent application DE 44 01 318 A1. For this purpose, rubber-coated sleeves which are spirally bent together having special sealing rings made of elastically resilient, corrosion-resistant steel sheet are used, which are inserted into the pipe to be sealed up to the point of leakage. There they are expanded by means of an inflatable air cushion or a mechanical mounting device until they are pressed very tightly onto the interior wall of the pipe while pressing the sealing rings together. A locking device having a pinion meshing with a row of teeth and a resilient locking bolt engaging in its teeth holds the sealing sleeve in its expanded position. However, the disadvantage here is the difficult manipulation, which largely precludes mechanical manipulation, and the non-secure sealing.

A sealing interior sleeve consisting of an expandable steel strip for inserting into leaking pipes to be repaired having a locking device which allows very small locking steps is known from the European patent EP 0 805 932 B1, which corresponds to U.S. Pat. No. 5,769,459. For this purpose, a slot provided with two rows of teeth is provided on the interior strip end, while a tensioning pinion, a guide pinion and a locking pinion are rotatably mounted on the exterior strip end. A tension spring engages the axis of rotation of the locking pinion, holds the locking pinion in engagement with the guide pinion and presses it into the space between the tensioning pinion and guide pinion. With the aid of the locking pinion acting as a bolt under the action of the tension spring, after the expansion has taken place, the tension of the inner sealing sleeve is almost completely retained after the locking bolt has engaged with the tensioning pinion, which is a prerequisite for highly effective sealing of the leak. The expansion of this interior sealing sleeve proves to be very complex and cumbersome to manipulate, and particularly unsuitable for mechanical manipulation.

A sealing sleeve for inserting into a piping system in order to seal a leak comprising a steel sheet which is annularly bent together and can be expanded and the interior strip end and exterior strip end of which overlap in the circumferential direction is known from the German utility model DE 20 2016 104 723 U1. It is provided with at least one locking device in the form of a slot which is arranged in the steel strip in the circumferential direction and which has at least one row of teeth, said locking device also having at least one detent member, which is suitable for engaging in at least one row of teeth. Furthermore, at least one detent member has a carrier which is provided with a plurality of spring elements which are designed to be elastically resilient and pivotable resiliently against the carrier and are suitable for engaging in at least one row of teeth. This sealing sleeve has a locking device which is easy to manipulate, the detent effect of which depends very specifically on the materials selected and the dimensions of the spring elements.

SUMMARY OF THE INVENTION

It is therefore an object of the present invention to provide a sealing sleeve for inserting into a piping system in order to seal a leak in a piping system and a piping system in order to seal a leak with such a sealing sleeve according to the invention, which allows secure sealing of a piping system from the interior, in particular in the region of abutting pipes, is easy to manipulate and suitable for mechanical manipulation.

This object is achieved by a sealing sleeve for inserting into a piping system in order to seal a leak in a piping system and by a piping system.

The sealing sleeve according to an exemplary embodiment of the invention for inserting into a piping system for the internal sealing thereof is formed of a steel sheet, which is annularly bent together and can be expanded and the strip ends of which overlap in the circumferential direction. It has at least one locking device in the form of a slot which is arranged in the steel sheet and aligned in the circumferential direction and which has at least one row of teeth and at least one detent member. According to the invention, the detent member is suitable for engaging in at least one row of teeth and, according to the invention, is of a multi-part design with at least one guide element, at least one detent element and at least one tensioning element, which is arranged between a guide element and a detent element. This takes place according to the invention in such a way that the tensioning force between the guide element and the detent element defines the detent effect of the detent member in connection with the row of teeth in which it engages. The detent effect changes depending on the tensioning state and the extent of the tensioning force. The guide element ensures, according to the invention, a secure and reliable guidance of the tensioning force onto the detent element and thus in the direction of the row of teeth into which the detent member or the detent element of the detent member can engage. The detent member and the corresponding sealing sleeve according to the invention have a simple structural design. Reliable functionality is achieved, even under difficult conditions, which furthermore also provides the option of manipulation by robots or other mechanical devices. This is preferably achieved using an electric-motor tensioning device or hydraulic tensioning device.

The structure of the detent member integrated according to the invention without additional, separate resilient elements allows these advantages to a particular extent.

An exemplary sealing sleeve according to the invention for inserting into a piping system for the internal sealing thereof has at least one locking device in the form of a slot which is arranged in the interior strip end in the circumferential direction and which has at least one row of teeth, said locking device also having at least one detent member connected to the exterior strip end. The detent member is suitable for engaging in at least one row of teeth and thereby fixing the circumference of the annularly bent steel sheet of the sealing sleeve. This design of a locking device of the sealing sleeve according to the invention makes it possible for the exterior strip end to be flat and continuous in the region of the locking device, and thus a particularly secure sealing effect can be achieved in this region, in particular in connection with a radially outwardly adjoining rubber band. In addition, the manipulation of this sealing sleeve with such a locking device proves to be particularly simple, since the manipulation can take place primarily from the interior region of the steel strip which is closed to form a ring. This is particularly advantageous if the locking device is designed as a detachable, openable locking device.

The sealing sleeve can have at least one locking device in the form of a slot which is arranged in the exterior strip end in the circumferential direction and which has at least one row of teeth, said locking device also having at least one detent member connected to the interior strip end. The detent member is suitable for engaging in at least one row of teeth and thereby fixing the circumference of the annularly bent steel sheet of the sealing sleeve. This design of a locking device of the sealing sleeve according to the invention makes it possible for the interior strip end to be flat and continuous in the region of the locking device, thus protecting the locking device from damage or incorrect manipulation in this region.

The sealing sleeve cam be formed a steel sheet, which is annularly bent together and can be expanded and the strip ends of which overlap in the circumferential direction. It has at least one locking device in the form of a slot which is arranged in the strip-shaped steel sheet and aligned in the circumferential direction and which has at least one row of teeth and at least one detent member. The interior strip end is guided in a groove between the exterior strip end and a cover surface fixedly connected to the exterior strip end. In a slot having one or more rows of teeth, which is arranged in the cover surface and/or in the exterior strip end and is aligned in the circumferential direction, the detent member according to the invention is mounted, in particular mounted in a floating manner. The detent member defines the extent of the expansion of the strip-shaped steel sheet and thus the circumference of the sealing sleeve according to the invention. This is achieved in particular by the detent member reducing the degree of penetration of the interior strip end into the groove, thereby causing an expansion. In this case, the one or more tensioning elements are preferably designed to be elastically resilient, while the other parts of the detent member are preferably essentially rigid.

The multi-part detent member has a simple structural design. Reliable functionality is achieved, even under difficult conditions, which furthermore also provides the option of manipulation by robots or other mechanical devices. This is preferably achieved using an electric-motor tensioning device or hydraulic tensioning device. The structure of the detent member integrated according to the invention without additional, separate resilient elements allows these advantages to a particular extent.

The detent member of the sealing sleeve according to the invention, which is mounted in the slot, in particular in a floating manner, can be provided with a device for preventing it from sliding out of the slot—in particular by means of protruding projections which are arranged on the cover surface and/or in the region of the slot at the strip end with the slot, which spatially define the detent member(s)—which further improves mechanical manipulation.

The strip-shaped steel sheet can be formed from a plurality of strip segments which are connected to one another and form the entire, continuous steel sheet. The strip segments are preferably detachably connected to one another in such a way that assembly in the region of the leak in the piping system to be sealed or disassembly of the strip-shaped steel sheet is made possible, which is particularly important in the case of piping systems to be sealed with a large internal diameter. This preferred development allows manipulation, in particular mechanical manipulation, to a particular extent. The detachable connection is preferably implemented as a tongue and groove connection and this is in particular formed uniformly to the tongue and groove connection of the locking device. This allows modular use, in particular the exchange of individual strip segments. Hinge-like, in particular detachable hinge-like, connections of the individual strip segments have also proven successful.

In addition to the possibility of providing a single locking device in a single region on the circumference of the sealing sleeve according to the invention, it has proven to be particularly advantageous to provide several, in particular two, locking devices of the same type. These two locking devices preferably have the same detent members, the same slot orientation, the same slot length and preferably the same rows of teeth. This design of the components of the plurality of locking devices ensures, on the one hand, a very secure detent connection as a result of the increased number of detent connections—especially for very large sealing sleeves according to the invention, i.e. for large internal diameters of a piping system and/or for large widths of the sealing sleeve—and, on the other hand, a very good sealing effect, since an unwanted oblique locking of the overlapping strip ends is largely prevented. In this case, a plurality of such regions with a plurality of locking devices can also be provided, especially when using a plurality of strip segments.

At least one tensioning element of the detent member of the sealing sleeve can be designed as a wedge and/or as a spring element. Depending on the degree of insertion of the wedge into the gap, the gap width and thus the tensioning force and consequently the detent effect can be varied, as a result of which an effective locking is achieved when the desired locking position is reached. Alternatively or in addition, it has proven useful to provide a spring element as a tensioning element which projects into the gap and resiliently moves the detent element relative to the guide element and thereby changes and fixes the tensioning force and consequently the detent effect. By using spring elements of this type, a mechanism for actuating a wedge can be dispensed with, which simplifies the structure of the detent member and thereby makes it less sensitive. In connection with a spring element as a tensioning element, the teeth of the rows of teeth or the detent member are preferably designed in such a way that the choice of the pitch or shape of the teeth makes it more difficult or even prevents the detent member from slipping back and thus loosening the sleeve, while simplifying the expansion of the sealing sleeve compared to loosening.

Of the many different designs of a spring element as a tensioning element, those that have been arranged as a single curved spring element in the gap, which apply a different tensioning force to the detent element depending on the radius of curvature, or which are arranged obliquely in the gap as a straight spring element and are laterally deflected and, depending on the extent of the lateral deflection, apply a different tensioning force to the detent element, have proven particularly useful. These preferred spring elements in particular have proven their worth through their simple structure and their specific possibility of defining the desired tensioning force range.

In addition to the possibility of providing a single tensioning element in a single gap, it has proven particularly useful to arrange a plurality of tensioning elements in a single gap between a guide element and a detent element. This makes it possible to achieve particularly high tensioning forces and therefore particularly effective detent effects. Furthermore, by arranging a plurality of tensioning elements in a single gap, it is possible to prevent the risk of the detent element tilting in the guidance of the guide element due to tensioning on one side and thereby to improve the reliability of functionality. It has proven particularly useful to space the tensioning elements clearly apart from one another in the single gap, in particular to distribute them uniformly in the gap and thereby to allow a uniform action of the tensioning force. Preferably, similar, in particular equivalent tensioning elements are used, which facilitate manipulation, in particular maintenance.

The sealing sleeve can have a detent member with at least one guide element, which is U-shaped and which surrounds at least one detent element. This design ensures that the detent element is guided laterally by both legs of the U-shaped guide element and is thus pressed in the direction out of the U by the tensioning element(s) and is thereby pressed onto the row of teeth of the slot located there and thus engages. The guidance is particularly advantageous if the width of the detent element is selected to be slightly less than the distance between the two legs and if the distance between the legs is selected to be constant or largely constant over the length of the legs. In the case of a U-shaped guide element, the tensioning element(s) are preferably arranged in the gap at the base of the U-shaped guide element between the two legs of the U-shaped guide element, which ensures particularly reliable functionality. It has also proven to be appropriate to design at least one detent element of a detent member in a U-shape and thus to guide the movement of at least one guide element.

A detent member can be provided with at least one projection on a guide element or a detent element, which engages in a recess corresponding to the projection in a detent element or guide element and guides it in a leading manner. According to the invention, this guidance prevents the detent element from tilting relative to the guide element or shifting too laterally, so that the function of the detent member is restricted or even prevented. This ensures that the operational reliability of the sealing sleeve is particularly effective.

The sealing sleeve can have one or more detent surfaces in the circumferential direction on a single side of the detent member, which are suitable for engaging in a row of teeth of a slot. The provision of the detent surfaces on only one side facilitates the movement of the detent member, since only one side engages and the other sides are guided without sliding in the slot. In this way, it is possible to simplify manipulation on the one hand and to reduce the complexity of the detent member on the other. It is also possible to use the detent member in a slot with two rows of teeth once as a left-locking detent member and alternatively as a right-locking detent member, which the user can select as required.

The one or more detent surfaces can be formed, for example, by rough surfaces in the manner of friction surfaces or by surfaces which are at an angle to the circumferential direction, for example as surfaces of detent teeth or detent webs, which have a detent effect under the action of a tensioning force and restrict the freedom of movement of the detent member and thus of the locking device in the circumferential direction. The size, number and/or orientation of the detent surfaces are preferably selected in such a way that they restrict loosening of the sealing sleeve more than expansion of the sealing sleeve. This means that tightening and sealing the sealing sleeve onto the pipe to be sealed is less restricted than loosening. As a result, it is easier to widen and tighten the sealing sleeve than to loosen it, which can prevent an undesirable loosening and thereby simplify manipulation.

It has proven particularly useful to select the distance between the free ends of the detent teeth or detent webs on one side of the detent member to be equal to or largely equal to the distance between the teeth of the row of teeth of the slot in which they are to engage. This ensures that many of the detent teeth or detent webs engage on one side in the associated spaces between the teeth of a row of teeth—these have the same distance as the teeth of the row of teeth—and thus ensure a particularly secure detent connection.

The detent surfaces can be arranged symmetrically to the longitudinal axis of the detent member or to a plane, in particular the central plane, which extends in the longitudinal direction of the detent member. These are suitable for engaging, for example, in different rows of teeth in a slot. The symmetry does not require exact positioning of the detent surfaces in the mathematically symmetrical sense. Deviations from this mathematically exact positioning, for example due to a lateral offset, do not lead to a significantly inferior development of the invention. The symmetrical arrangement of the detent surfaces on two opposite sides of the detent member (symmetry) allows a uniform fixation in the manner of a detent connection with, for example, two rows of teeth on two sides of the slot, which leads to the desired secure connection and easy manipulation. This leads to a force compensation of the detent connections on both sides of the detent member and thus promotes, in particular, the security of the detent connection and, in particular, the possibility of mechanical manipulation to a particular extent.

At least one detent member can be provided with at least one guide portion, which is arranged in front of or behind the remainder of the detent member in the circumferential direction. The guide portion is fixedly connected to the remainder of the detent member and slides in the slot in the circumferential direction in front of or behind the remainder of the detent member in the longitudinal direction of the slot. The guide portion or preferably the two guide portions guide the detent member in the slot in such a way that lateral tilting from the circumferential direction, which represents the desired sliding direction of the detent member, is restricted. This is made possible by the guiding function of the guide portion, in particular by the extension of the detent member into the slot.

This is particularly reinforced by the fact that the width of one or more guide portions is selected to be equal to or preferably slightly less than the free width, in particular the smallest free width of the slot. This allows undesired tilting to be kept particularly low. As a result, a secure seal and reliable manipulation have been achieved. This manipulation is particularly suitable for mechanical use.

If at least one detent member has a height of more than the strip thickness, preferably the multiple strip thickness, in particular more than 3 times the strip thickness, in particular in the range of 5 times the strip thickness, it is thus possible in a particularly advantageous manner to create a locking device which allows a secure seal for different piping systems with different internal diameters. Through the selection of the height of the detent member according to the invention, it is possible in a reliable manner to compensate for possible and different distances between the overlapping strip ends in the region of the detent member without the desired detent effect being lost or being substantially weakened. Especially with small inner pipe diameters or with large overlapping regions of the strip ends, there is a particular risk of a large distance, in particular a particularly pronounced distance between the strip ends in the region of the detent member. This can lead to the teeth of the strip slipping out of the detent member, which can lead to a significant deterioration in the detent effect or even the loss thereof. The negative effects of such a distance are restricted or even canceled out by this preferred design of the detent member.

This is particularly ensured if the locking device has at least one cover, which is in particular detachably connected to at least one detent member. The cover protrudes beyond the detent member and, according to the invention, holds the interior or exterior strip end down with the locking device. This interior or exterior strip end is thus fixed between the exterior or interior strip end and the cover, thereby ensuring a secure and permanent connection of the detent connection between the detent member and the at least one row of teeth. On the one hand, the cover ensures an undesirable separation of the components of the locking device, in particular the detent member and the slot into which the detent member engages, and on the other hand, limiting the scope between the exterior or interior strip end and the cover ensures a reliable, in particular even engagement in the row of teeth. In this case, the cover preferably adjoins the detent member(s) laterally projecting and thereby prevents the teeth of the slot from sliding out of the free ends of the detent teeth or detent webs of a detent member.

In addition to the possibility of fixedly connecting the cover to the detent member, which leads to a less sensitive sealing sleeve according to the invention, it has also proven useful to detachably connect the cover to the detent member. This is preferably achieved by screwing. The detachable connection allows the cover and the detent member to be separated, as a result of which the interior or exterior strip end is no longer fixed between the cover and the exterior or interior strip end and can thus be separated from the detent member. The teeth of the rows of teeth can slide out of the spaces between the free ends of the detent teeth or detent webs of a detent member, so that the strip-shaped steel sheet of the sealing sleeve can be narrowed again, which leads to a reduced diameter or circumference. In this state, the sealing sleeve according to the invention can be removed from the piping system and replaced by another.

In addition, the sealing sleeve can have at least one detent member which is fixedly connected, in particular fixedly welded, to the interior or exterior strip end. Especially in connection with a preferably fixedly connected cover, a robust, durable and low-maintenance sealing sleeve is created, which can be introduced into the piping system to be sealed at the leak in the narrowed state in order to then widen it by reducing the overlapping of the strip ends.

The detent member can be provided with at least one recess for receiving at least one elevation, in particular at least one pin on the exterior or interior strip end without a slot. This creates the possibility of detachably connecting the at least one detent member in the slot to the exterior or interior strip end without a slot. By inserting the elevation or pin into the recess of the detent member, the detent member can be replaced by another detent member with different properties, in particular with larger detent teeth or detent webs, if necessary. The possibility is also created that the detent member moves laterally relative to the exterior or interior strip end without a slot or to the elevation or pin. This means that tolerances, for example from production, can be compensated, which is especially possible in the case of detent members with symmetrically distributed detent surfaces and two rows of teeth arranged symmetrically in the slot as a result of the equilibrium position with balanced tensioning forces or detent forces for both detent connections. This leads to a particularly secure detent connection and thus to a very reliable seal by the sealing sleeve according to the invention.

It has proven to be particularly advantageous to design the at least one recess and the at least one elevation in such a way that the detent member can be arranged non-rotatably on the exterior or interior strip end without a slot. Securing against rotation is preferably achieved in that the corresponding recesses or elevations have a shape which allows the elevation to be introduced into the corresponding recess only in a single orientation. Alternatively, it has also proven to be useful to design and/or arrange a plurality of recesses and elevations in such a way that they can only be joined in one orientation. In this way, it is possible to avoid a malfunction due to an incorrect orientation of the detent member and thereby to ensure the functionality of the sealing sleeve even under difficult conditions during assembly, particularly in the case of mechanical assembly.

It has proved useful to connect the cover to one or more elevations which protrude through a corresponding recess in the detent member. The connection can be detachable, in particular by screwing or by means of a bayonet joint or detent connection, or fixed, in particular by welding or soldering or gluing or riveting. This preferred sealing sleeve allows, on the one hand, a flexible adjustment of the position of the detent member around the at least one elevation, which is in particular pin-shaped, and on the other hand, a secure detent connection as a result of the restricted freedom of movement of the interior or exterior strip end or the slot between the cover and the exterior or interior strip end. The detachable connection between the cover and the elevation is preferably selected when a later removal of the sealing sleeve from the piping system is to be made possible in a simple manner. This is achieved in particular by the design of the detachable connection by means of a bayonet joint or detent connection.

It has proven particularly useful to design at least one elevation, in particular at least one pin, in the region of the cover as a wobble rivet, which is deformed on the side of the cover by means of a wobble riveting tool in such a way that the cover can no longer be detached from the wobble rivet and the rivet head widened by the wobble riveting tool projects over the cover only slightly or not at all. This is all the more successful if the recess in the cover for receiving the wobble rivet has a chamfer on the outer edge through which the head widened by the wobble riveting tool is completely or largely received. This makes it possible to largely rule out damage, in particular tearing off the rivet head produced, on the outside of the cover, thereby ensuring the functionality of this sealing sleeve.

Alternatively or in addition, it has proven useful to design at least one elevation, in particular at least one pin, as a diameter-stepped elevation, in particular as a diameter-stepped pin. The stepped diameter of the different opening diameters of the interior strip, the detent member of the exterior strip and/or the cover is selected accordingly. As a result, in addition to the lateral guidance of the elevation or the pin, it is possible to achieve an axial guidance of the strips or of the cover or of the detent member. This reduces the risk of malfunction.

The cover can be designed in such a way that it is bent in at least one edge region arranged laterally to the circumferential direction. The bending occurs in such a way that the edge of the cover is lowered in the direction of the exterior or interior strip end. This creates a trapezoidal cross section. The one or more bending lines are preferably selected in such a way that they are not arranged in the region of the detent member and thus run parallel to the circumferential direction outside the expansion of the detent member. The distance from the exterior or interior strip end, which is reduced as a result of the bent bevels of the cover, is chosen to be smaller than the height of the detent member. It is preferably selected to be about half the height of the detent member. In this way, it is possible to restrict the interior or exterior strip end in the region of the locking device in the radial direction in terms of its freedom of movement and to fix it in such a way that the functionality of the locking device is ensured to a particular extent.

If at least one cover arranged on the inside of the overlapping strip ends is designed to taper in the circumferential direction and/or at least one cover arranged on the outside of the overlapping strip ends is designed to enlarge in the circumferential direction, it is possible to subject the radially fixed interior or exterior strip end to a small amount of buckling, which has a positive effect on the structure of the sealing sleeve according to the invention and allows reliable locking. The edge of the cover preferably has the contour of a segment of a circle, which in particular has a radius corresponding to the internal radius of the piping system to be sealed. As a result, even in the sealing state, a uniform and flat contact of the interior strip end against the cover is facilitated, which reduces undesirable bending of the strip-shaped steel sheet.

In addition to the possibility of designing the cover to be deformable, in particular plastically deformable, it has proven particularly useful to make at least one, in particular a plurality of, covers elastic, as a result of which the cover, together with the steel sheet, can resiliently adapt to the piping system to be sealed. This results in a very robust sealing sleeve. The cover in the region of the slot is preferably designed in such a way that it lifts above the slot from the strip end with the slot, as a result of which the detent member in the slot and the space thus created between the cover and the strip end with the slot can slide smoothly along the slot. This makes it possible to reduce the friction between the cover and the detent member.

At least one, in particular all, of the covers can be provided and designed in such a way that it/they completely or largely cover(s) a slot which is associated with the cover. This overlap, in particular if the cover is arranged on the exterior of the steel strip, advantageously prevents damage to the locking device with the detent member or slot or other components of the system for sealing a piping system, in particular the rubber band arranged on the outside of the steel strip with its chambers which can optionally be filled with fluid. If the slot is completely covered, the protection is particularly high. This protection also simplifies the manipulation of the sealing sleeve.

Furthermore, it has proven particularly useful to fixedly connect at least one cover, in particular all covers, to one end of the strip, in particular to the exterior strip end in the region of the slot which is associated with the cover, in particular to connect this slot in a surrounding manner. This connection is preferably made by gluing, welding, soldering, riveting or screwing or by means of a bayonet joint or detent connection. These connections ensure a secure, partially detachable connection of the cover to a strip end, as a result of which the protection is particularly pronounced in the case of a connection surrounding the slot.

The sealing sleeve can have at least one slot, which has a receiving region for a guide portion or for a part of the detent member in its end region. The receiving region is designed in such a way that it has no teeth. This makes it possible, in particular, to create a starting position for the detent member in the slot. In this starting position, the sealing sleeve according to the invention can be transported, introduced into the piping system and brought to the leak. In this starting position, the detent connection has not yet engaged, and thus a certain flexibility has been created, which allows widening or narrowing if necessary, without engaging. This considerably improves the preparatory manipulation of the sealing sleeve according to the invention, in particular the transport of the sealing sleeve according to the invention to the leak, and in particular allows mechanical manipulation. At the leak, the sealing sleeve according to the invention is widened, as a result of which the detent member leaves the receiving region and engages with the detent surfaces in the at least one row of teeth until the desired sealing effect is achieved.

The sealing sleeve can have one or more guide elements in the edge regions of one or more strip ends in the overlapping region, which can receive and guide the respective other strip end. Alternatively or in addition, guide elements can also be arranged in the region of the slot and project through the slot and accommodate and guide the other strip end with the slot. The guide elements are in particular formed in a bracket-shaped manner in such a way that they enclose the edge of the other strip end and can thereby lead and guide it. As a result, the guided interior or exterior strip end slides evenly along the exterior or interior strip end, in such a way that both preferably have essentially the same and also constant radius. This is particularly the case if the guide elements tightly enclose the edge of the guided strip end in the edge region or in the region of the slot, without there being a jamming of the guided strip end and thus the possibility of low-resistance sliding of the guided strip end. The guidance in the region of the overlap of the strip ends and thus in the region of the detent member(s) ensures a particularly effective and defined detent connection of the locking device and easy manipulation of the sealing sleeve with the locking device, which is characterized by a uniform adjusting force, which in particular improves the possibility of mechanical manipulation.

A system according to the invention for sealing a piping system is provided with at least one sealing sleeve according to the invention and with at least one rubber band for inserting between a sealing sleeve and the piping system to be sealed in the region of the leak. The rubber band lies on the outside of the annular steel sheet of the sealing sleeve and is expanded as the sealing sleeve widens and is pressed onto the interior of the piping system to be sealed in the region of the leak. In this position, the detent connections engage between a detent member and the row(s) of teeth, thereby ensuring permanent sealing.

Preferably, the sealing sleeve is chosen so that the locking device with a slot and a detent element is arranged on the interior strip end and/or in the case of an arrangement on the exterior strip end, this is provided with a cover which largely or completely covers the slot, whereby damage to the rubber band by the locking device according to the invention is excluded or the risk for this is significantly reduced.

The rubber band(s) is/are made of rubber-elastic material, preferably ethylene propylene diene monomer rubber (EPDM), ethylene propylene rubber (EPM), natural rubber (NR), nitrile butadiene rubber (NBR) or styrene butadiene rubber (SBR). This ensures a permanent seal and easy manipulation as a result of the special rubber-elastic properties of the material of the rubber band.

In a particularly preferred system for the internal sealing of a piping system, the rubber band can form a ring which, in particular in the edge region, has at least one in particular annular bead with increased material thickness and/or at least one in particular tubular chamber which can be filled with a fluid. The bead(s) or the tubular chamber(s) make it possible to ensure a reliable, preferably annular seal in the edge region of the rubber band to the interior wall of the piping system, wherein the annular seal is pressed against the interior wall in a sealing manner with the aid of the sleeve according to the invention. This pressure is permanently ensured with the aid of the detent connection.

As a result of the preferred provision of beads or chambers in both edge regions of the rubber band, the intermediate region of the rubber band is hermetically sealed, so that a leak in the intermediate region is sealed in a particularly secure and reliable manner. In the case of provision of annular chambers, the sealing effect is achieved in a supportive manner in such a way that the chambers can be filled with a fluid, in particular a liquid, and the filling is secured against undesired emptying with the aid of a check valve. The filling is preferably carried out exclusively with a liquid, so that the sealing effect is achieved particularly reliably by pressing.

In addition, it has proven useful to provide the strip-shaped steel sheet of the sealing sleeve with a device for guiding the rubber band, which prevents lateral displacement, in particular the sliding out of the rubber band relative to the sealing sleeve. Alternatively or cumulatively, it has also proven useful to provide a device for guiding the sealing sleeve on the rubber band. As a result, a spatial association of the rubber band(s) with the sealing sleeve according to the invention is predetermined and thereby a reliable seal is ensured with the aid of the pressed rubber band.

The device for guiding can be formed by one or more elevations on the sealing sleeve or in the edge region of the rubber band, wherein the one or more elevations either engage in corresponding recesses on the rubber band or on the sealing sleeve or enclose them laterally in such a way that an undesired amount of lateral displacement or sliding out is prevented.

The systems according to the invention and the sealing sleeves according to the invention in the various embodiments have proven to be particularly simple to use and allow improved, machine-assisted manipulation. In addition, the invention also ensures a very reliable and permanent seal.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
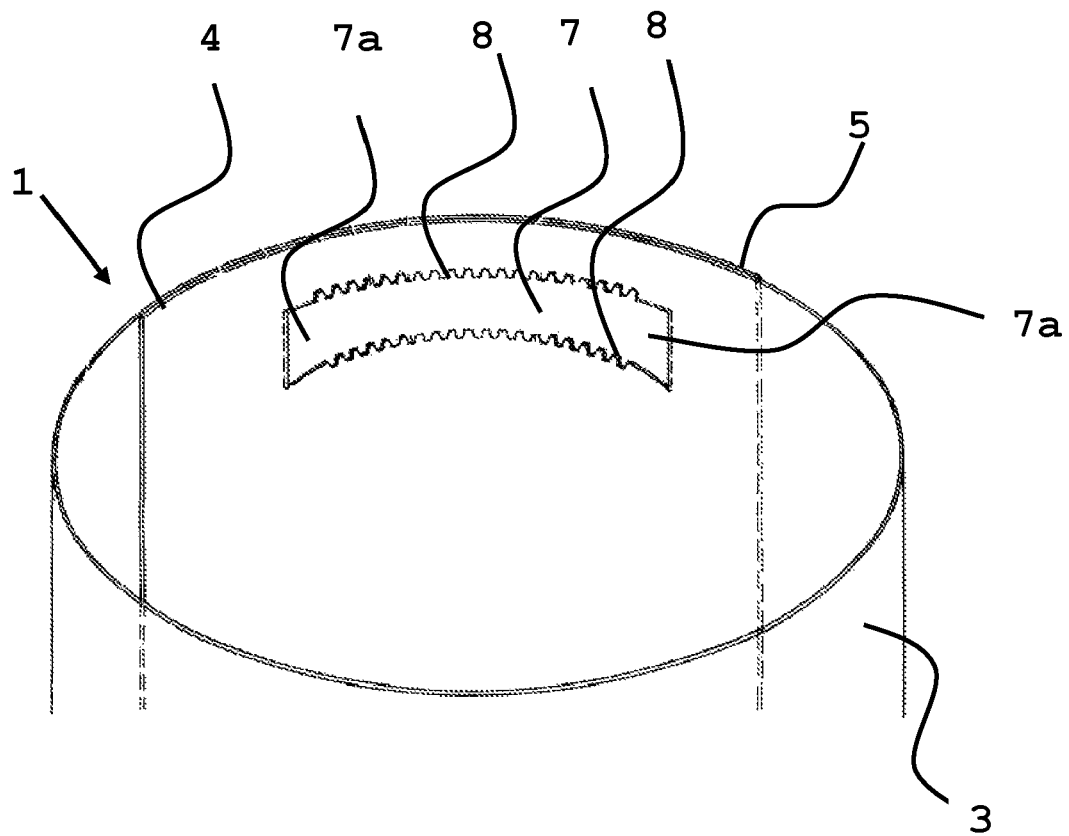
FIG. 1 is a schematic view of an exemplary sealing sleeve from the side.
Figure 2:
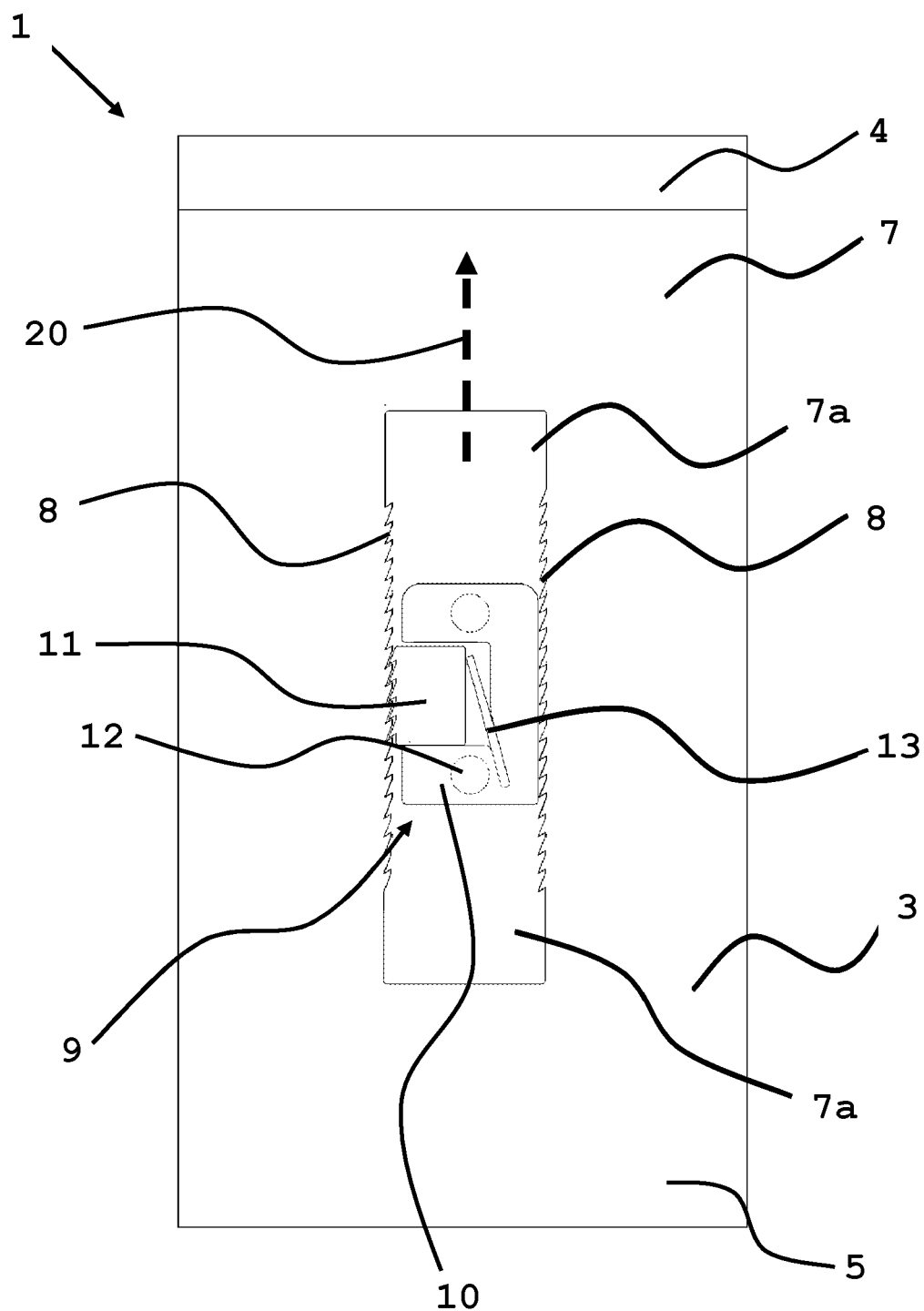
FIG. 2 is a plan view of the overlapping region of an exemplary sealing sleeve without a cover.
Figure 3:
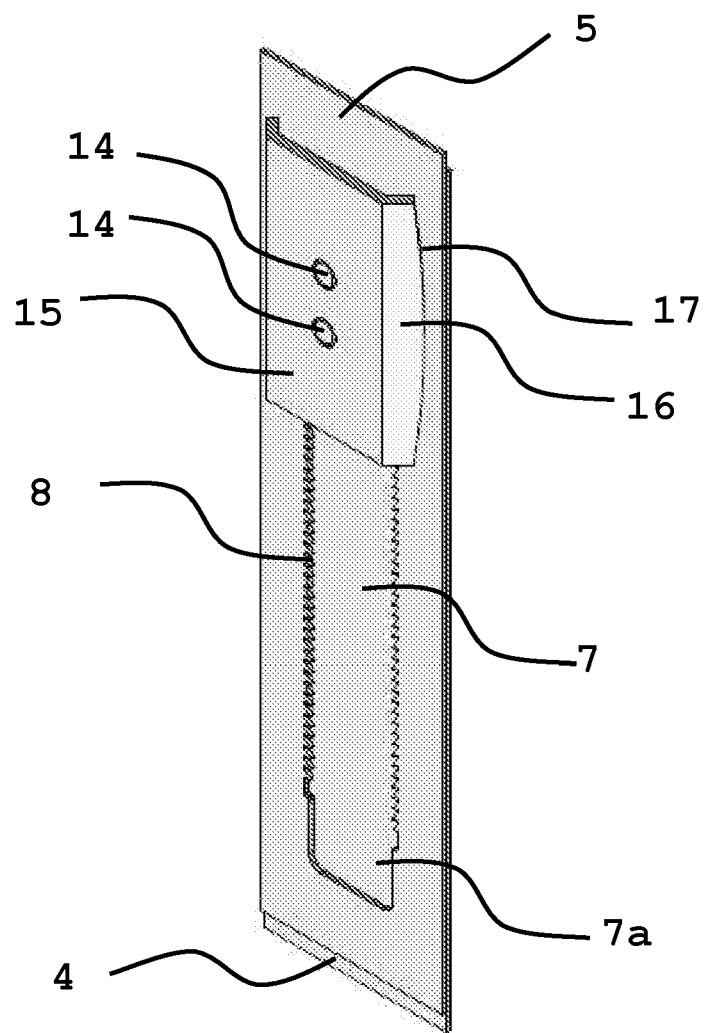
FIG. 3 is an oblique view of the overlapping region of an exemplary sealing sleeve and FIG. 4 is a cross section of an exemplary system for the internal sealing of a piping system with a sealing sleeve and a rubber band.

The sealing sleeve 1 according to the invention for inserting into a piping system for the internal sealing thereof is formed of a steel sheet 3, which is annularly bent together, can be expanded and is between one and three millimeters thick, and the strip ends 4, 5 of which overlap in the circumferential direction 20. It has at least one locking device in the form of a slot 7 which is arranged in the exterior strip end 5 and oriented in the circumferential direction 20 and which has two rows of teeth 8 and a detent member 9 connected to the interior strip end 4. The detent member 9 is not shown in FIG. 1, the slot 7 is shown in a see-through representation. In FIGS. 2 and 3, the detent member 9 is shown in more detail.

The sealing sleeve 1 according to the invention is enclosed by an annular rubber band 30 and, in the narrowed state, i.e. in the unexpanded state, is introduced into the piping system and positioned at the leak. The system includes a rubber band 30 and a sealing sleeve 1 is then expanded until the sealing sleeve 1 with the rubber band 30 lies flat against the interior of the piping system and seals the leak located in this region. With the aid of the locking device, it is ensured that the expanded state, which is characterized by the sealing pressing of the sealing sleeve 1 with the rubber band 30, is maintained.

FIG. 2 shows a portion of the sealing sleeve 1, which displays the overlapping region of the strip ends 4, 5 of the strip-shaped steel sheet 3. The exterior strip end 5 has a slot 7 which extends in the circumferential direction 20 of the annular, strip-shaped steel sheet 3. Two rows of teeth 8 are arranged along the two longitudinal sides of the slot 7. At both ends of the slot 7 there are receiving regions 7a, which are designed without teeth and which can receive the detent member 9 proportionately.

FIG. 2 shows a state in which the detent member 9 has left the receiving region 7a and has engaged, in that the detent teeth of the detent element 11 has engaged in the row of teeth 8 of the slot 7.

The detent member 9 has a multi-part structure, formed of a U-shaped guide element 10, between the legs of which a detent element 11 is arranged. The detent element 11 has a width which is slightly less than the distance between the legs of the U-shaped guide element 10. A tensioning element 13 designed as a spring element 13 is located in the gap between the base of the U-shaped guide element 10 and the detent element 11. As a result of its spring force, this spring element 13 pretensions the detent element 11 in such a way that it is pressed out of the region between the legs of the U-shaped guide element 10 in the direction of a row of teeth 8. The detent effect of the detent member 9 is determined in the locking device of the sealing sleeve 1 by this tension.

The detent member 9 with a U-shaped guide element 10 with a detent element 11 and a spring element 13 has a plate-like structure with an essentially uniform height. This improves the interaction of the components of the detent member 9 and the locking device of the sealing sleeve 1.

The U-shaped guide element 10 does not have any detent surfaces, while the detent element 11 on the side facing the row of teeth 8 has a plurality of detent teeth, which together form the one detent surface of the detent element 11. The detent teeth of the detent element 11 correspond in terms of distance and depth to the recesses in the row of teeth 8 of the slot 7, into which the detent element 11 of the detent member 9 engages.

This allows a common engagement of all or more detent teeth of the detent element 11 into the spaces between the teeth of a row of teeth 8. This leads to a particularly secure detent connection.

The two surfaces of the spaces between the teeth of a row of teeth 8 are slanted to different degrees with respect to the circumferential direction 20. The surface arranged in front in the circumferential direction 20 is oriented less obliquely to the circumferential direction 20 (small angle), while the other surface has a larger angle to the circumferential direction 20, i.e. it is oriented obliquely. This means that an expansion of the sealing sleeve 1 results in less resistance by the detent member 9, since the detent surfaces relevant for this are aligned less steeply than a narrowing of the sealing sleeve 1, since the other relevant detent surfaces for this are aligned more steeply. The differentiated pitch of the detent surfaces makes it easy and secure to expand the sealing sleeve 1 and thus the sealing, while the narrowing of the sealing sleeve 1 with the associated sliding back of the detent member 9 in the slot 7 is made more difficult or even prevented.

These differentially beveled detent teeth and the differently sloping contact surfaces of the row of teeth 8 simplify the detent sliding of the detent member 9 along the rows of teeth 8 in the circumferential direction 20 (widening of the sealing sleeve 1) and, in turn, make it difficult in the opposite direction (narrowing of the sealing sleeve 1).

The detent member 9 with the guide element 10, detent element 11 and tensioning element 13 designed as a spring element 13 is made of steel or spring steel, as a result of which the functionality of the detent member 9 is particularly permanently ensured.

The detent member 9 has two cylindrical recesses 12 which are spaced apart. The recesses 12 receive the pins 14, which are welded to the interior strip end 4 and rise perpendicularly from the steel sheet 3 of the interior strip end 4. The diameter of the pin 14 is selected to be smaller than the diameter of the cylindrical recesses 12 in the detent member 9. As a result, there is the possibility that the detent member 9 can move on both pins 14 somewhat laterally to the longitudinal dimensions of the pins 14 and can thus move somewhat in the slot 7, in particular transversely to the longitudinal direction of the slot 7. This allows both tolerance compensation and force compensation in the detent connection.

As can be seen in FIG. 3, the pins 14 protrude from the interior strip end 4, starting beyond the detent member 9, into a cover 15 arranged above the detent member 9. The height of the detent member 9 with the guide element 10, detent element 11 and tensioning element 13 corresponds approximately to 3 times the thickness of the strip-shaped steel sheet 3. This ensures a secure detent connection of the detent member 9 to the rows of teeth 8 even if the exterior strip end 5 does not rest on the interior strip end 4, as shown in FIGS. 1 and 3, but is raised from it as long as the distance is not greater than the height of the detent member 9.

The provision of a cover 15, as shown in FIG. 3, ensures that the exterior strip end 5 cannot move too far from the interior strip end 4 of the detent member 9. The cover 15 restricts the freedom of movement of the interior strip end 4 in the vertical/radial direction and thereby ensures the advantageous detent connection between the detent member 9 and the rows of teeth 8 of the slot 7.

The cover 15 shown in FIG. 3 is welded to the two pins 14, such that the cover 15 is permanently connected to the exterior strip end 5 via the pins 14. The cover 15 protrudes laterally with its flat top surface beyond the detent member 9. The cover 15 has two edge regions 16, which are arranged laterally to the circumferential direction 20 and are designed to be bent in the direction of the strip ends 4, 5. The bending further limits the region in which the interior strip end 4 can move away from the exterior strip end 5, thereby further increasing the security of the detent connection.

The edge lines 17 of the edge regions 16 of the cover 15 have the contour of a segment of a circle, the radius of which corresponds approximately to the internal radius of the piping system to be sealed. This makes it possible to considerably reduce the risk of the strip-shaped steel sheet 3 buckling in the region of the detent member 9 with the cover 15, thereby on the one hand preventing the risk of damage to the strip 3 and on the other hand facilitating manipulation, since the forces to be applied are more uniform and lower.

Figure 4:
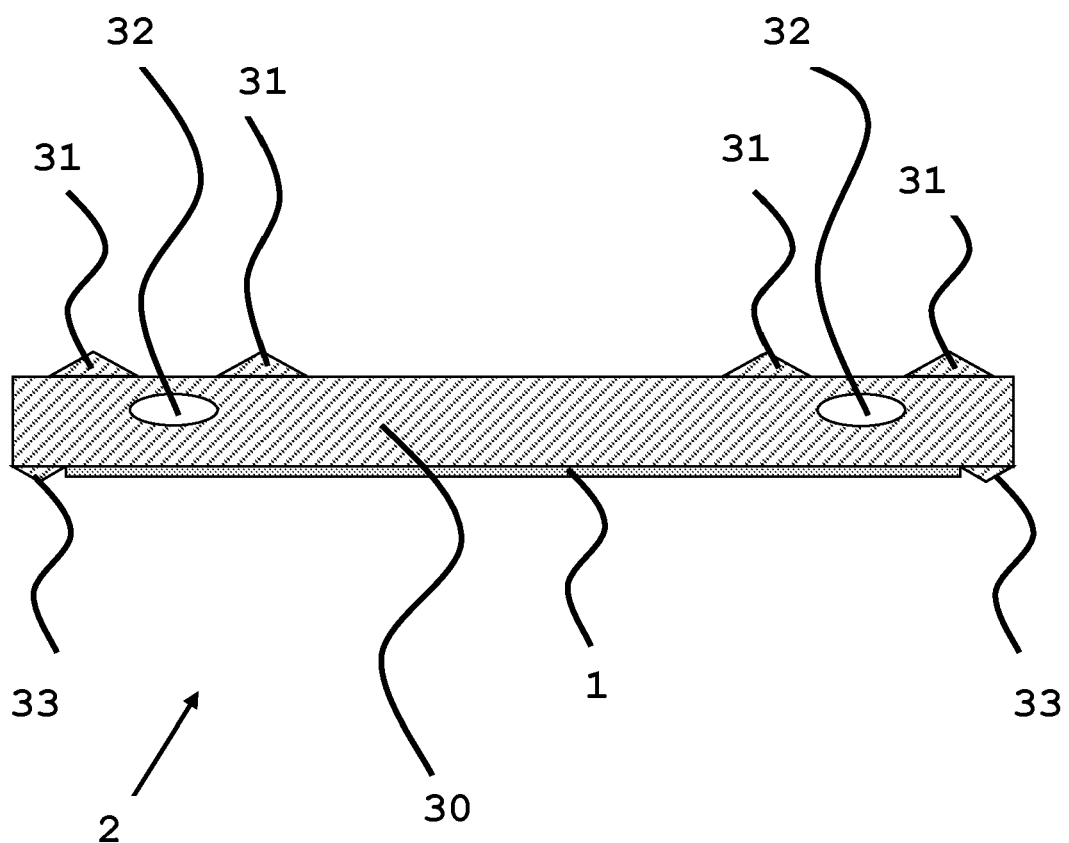

FIG. 4 is a cross section of an exemplary system 2 according to the invention for the internal sealing of a piping system with a sealing sleeve 1 and a rubber band 30. The strip 3 of the sealing sleeve 1 is adjoined in the radial direction by the rubber band 30 which, in the sealing state, presses with the side facing away from the sealing sleeve 1 to the interior of the piping system to be sealed.

The rubber band 30 shows annular elevations 33 on the right and left of the sealing sleeve 1, which surround the sealing sleeve 1 and prevent the rubber band 30 from sliding out laterally relative to the sealing sleeve 1. The annular elevations 33 form the device 33 for guiding the rubber band 30. This is very important for assembly under difficult conditions, which can be carried out in a machine-controlled manner, in particular using a robot.

On the side of the rubber band 30 facing away from the sealing sleeve 1, two beads 31, which annularly surround the sealing sleeve 1 and have a wedge-shaped cross section, are arranged in the left and right edge regions. These beads 31 lie against the interior wall of the leak in the piping system and each form closed sealing lines which also compensate in a sealing manner for unevenness in the structure of the interior wall. In addition, an annular chamber 32 is arranged in the rubber band 30 in the region between the beads 31, which can be filled with a fluid, in particular water. In the filled, expanded state, they allow an annular pressing of the rubber band 30 in the region of the chamber 32 and thus a particularly secure sealing.

The chambers 32 are preferably filled with fluid, in particular with water, only after the sealing sleeve 1 has expanded and the associated elastic band 30 has been pressed against the interior wall of the piping system to be sealed. This creates an additional sealing effect via the pressing as a result of the filling of the chambers 32. In order to allow the chambers 32 to be filled with fluid, feed lines for the fluid with a check valve in the rubber band 30 are provided. The feed lines extend through openings in the sealing sleeve 1, which allows the chambers 32 to be filled from the interior of the piping system to be sealed by the sealing sleeve 1 according to the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A sealing sleeve for insertion into a piping system in order to seal a leak, the sealing sleeve comprising:
   a steel sheet that is annularly bent together and expanded, wherein an interior strip end and an exterior strip end of the steel sheet overlap in a circumferential direction; and
   at least one locking device in the form of a slot that is arranged in the steel sheet in the circumferential direction and which has at least one row of teeth, and the locking device having at least one detent member which engages in the at least one row of teeth,
   wherein the at least one detent member has at least one guide element, at least one detent element and at least one tensioning element which is arranged between the at least one guide element and the at least one detent element,
   wherein the at least one detent member is configured such that a tensioning force between the at least one guide element and the at least one detent element is variable, and
   wherein the interior strip end is guided in a groove between the exterior strip end and a cover surface fixedly connected to the exterior strip end, and wherein the at least one detent member is mounted in a floating manner in the slot which is provided in the cover surface and/or in the exterior strip end.

2. A sealing sleeve for insertion into a piping system in order to seal a leak, the sealing sleeve comprising:
   a steel sheet that is annularly bent together and expanded, wherein an interior strip end and an exterior strip end of the steel sheet overlap in a circumferential direction; and
   at least one locking device in the form of a slot that is arranged in the steel sheet in the circumferential direction and which has at least one row of teeth, and the locking device having at least one detent member which engages in the at least one row of teeth,
   wherein the at least one detent member has at least one guide element, at least one detent element and at least one tensioning element which is arranged between the at least one guide element and the at least one detent element,
   wherein the at least one detent member is configured such that a tensioning force between the at least one guide element and the at least one detent element is variable, and
   wherein the at least one detent member is fixedly connected or fixedly welded to the interior strip end or the exterior strip end.

3. The sealing sleeve according to claim 2, wherein the slot is arranged in the interior strip end in the circumferential direction and the at least one detent member is connected to the exterior strip end.

4. The sealing sleeve according to claim 2, wherein the slot that is arranged in the exterior strip end in the circumferential direction and the at least one detent member is connected to the interior strip end.

5. The sealing sleeve according to claim 1, wherein the at least one tensioning element is designed as a wedge and/or as a spring element.

6. The sealing sleeve according to claim 1, wherein a plurality of the at least one tensioning element are provided and are arranged in a single gap between the at least one guide element and the at least one detent element.

7. A sealing sleeve for insertion into a piping system in order to seal a leak, the sealing sleeve comprising:
   a steel sheet that is annularly bent together and expanded, wherein an interior strip end and an exterior strip end of the steel sheet overlap in a circumferential direction; and
   at least one locking device in the form of a slot that is arranged in the steel strip sheet in the circumferential direction and which has at least one row of teeth, and the locking device having at least one detent member which engages in the at least one row of teeth,
   wherein the at least one detent member has at least one guide element, at least one detent element and at least one tensioning element which is arranged between the at least one guide element and the at least one detent element,
   wherein the at least one detent member is configured such that a tensioning force between the at least one guide element and the at least one detent element is variable, and
   wherein the at least one guide element surrounds the at least one detent element in a U-shape and is designed to guide movement, or wherein the at least one detent element the at least one guide element in a U-shape and is designed to guide movement.

8. The sealing sleeve according to claim 1, wherein detent surfaces are arranged in the circumferential direction on a single side of the at least one detent member, wherein the detent surfaces are suitable for engaging in the at least one row of teeth in the slot.

9. The sealing sleeve according to claim 1, wherein detent surfaces are arranged symmetrically to a longitudinal axis of the at least one detent member or to a plane or a central plane of the at least one detent member and which are suitable for engaging in different rows of teeth in the slot.

10. The sealing sleeve according to claim 1, wherein the at least one detent member has a height of more than a thickness of the steel sheet.

11. The sealing sleeve according to claim 1, wherein the at least one detent member is detachably connected to the interior strip end or the exterior strip end and has at least one recess for receiving at least one elevation, which is a pin on the interior strip end or on the exterior strip end.

12. The sealing sleeve according to claim 11, wherein the at least one recess and the at least one elevation are designed to be secured against rotation.

13. The sealing sleeve according to claim 1, wherein the at least one locking device has at least one cover which is detachably connected to the at least one detent member.

14. The sealing sleeve according to claim 1, wherein an end region of the slot is a receiving region for a guide portion or for a detent member, wherein the receiving region has no teeth.

15. A sealing sleeve for insertion into a piping system in order to seal a leak, the sealing sleeve comprising:
   a steel sheet that is annularly bent together and expanded, wherein an interior strip end and an exterior strip end of the steel sheet overlap in a circumferential direction; and
   at least one locking device in the form of a slot that is arranged in the steel strip sheet in the circumferential direction and which has at least one row of teeth, and the locking device having at least one detent member which engages in the at least one row of teeth,
   wherein the at least one detent member has at least one guide element, at least one detent element and at least one tensioning element which is arranged between the at least one guide element and the at least one detent element,
   wherein the at least one detent member is configured such that a tensioning force between the at least one guide element and the at least one detent element is variable, and
   wherein one or more guide elements are arranged in the edge region of one of the interior strip end or the exterior strip end, or in the region of a slot at the interior strip end or the exterior strip end and are suitable for receiving and guiding the other of the interior strip end or the exterior strip end in the overlapping region, wherein the guide elements are formed in a bracket-shaped manner and closely enclose the edge of the other of the interior strip end or the exterior strip end.

16. A system for the internal sealing of a piping system comprising at least one sealing sleeve according to claim 1 and a rubber band for inserting between the sealing sleeve and the piping system to be sealed.

17. The system for the internal sealing of a piping system according to claim 16, wherein the rubber band forms a ring and, in at least one edge region, at least one bead with increased material thickness and/or at least one tubular chamber that is fillable with a fluid.

18. The system for the internal sealing of a piping system according to claim 16, wherein the strip-shaped steel sheet of the sealing sleeve is a device for guiding the rubber band or the rubber band is a device for guiding the sealing sleeve, which prevents lateral displacement of the rubber band relative to the sealing sleeve.

* * * * *